(12) United States Patent
Oh et al.

(10) Patent No.: US 8,582,696 B2
(45) Date of Patent: Nov. 12, 2013

(54) METHOD AND APPARATUS FOR DATA QUANTIZATION AND PACKING WITH VARIABLE BIT WIDTH AND PERIOD

(75) Inventors: Seokyong Oh, San Diego, CA (US); Thomas Sun, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/407,876

(22) Filed: Feb. 29, 2012

(65) Prior Publication Data
US 2012/0275548 A1 Nov. 1, 2012

Related U.S. Application Data

(60) Provisional application No. 61/480,065, filed on Apr. 28, 2011.

(51) Int. Cl.
*H04L 27/06* (2006.01)
(52) U.S. Cl.
USPC ........... 375/341; 375/262; 375/316; 714/794; 714/795; 714/796
(58) Field of Classification Search
USPC ........... 375/262, 316, 341; 714/794, 795, 796
See application file for complete search history.

(56) References Cited

U.S. PATENT DOCUMENTS

| | | | | |
|---|---|---|---|---|
| 6,966,024 B2 * | 11/2005 | Park | | 714/780 |
| 6,986,096 B2 * | 1/2006 | Chaudhuri et al. | | 714/780 |
| 7,464,316 B2 * | 12/2008 | Bickerstaff et al. | | 714/755 |
| 7,756,222 B2 * | 7/2010 | Chen et al. | | 375/324 |
| 8,270,543 B1 * | 9/2012 | Fattal et al. | | 375/341 |
| 2005/0025076 A1 | 2/2005 | Chaudhuri et al. | | |
| 2007/0086541 A1 | 4/2007 | Moon et al. | | |
| 2012/0033767 A1 * | 2/2012 | Wilborn et al. | | 375/341 |

FOREIGN PATENT DOCUMENTS

| | | |
|---|---|---|
| WO | WO2008038879 A1 | 4/2008 |
| WO | WO2008148082 A1 | 12/2008 |
| WO | WO2012012248 | 1/2012 |

OTHER PUBLICATIONS

International Search Report and Written Opinion—PCT/US2012/030197—ISA/EPO—Jun. 11, 2012.

* cited by examiner

*Primary Examiner* — Leon Flores
(74) *Attorney, Agent, or Firm* — Fulbright & Jaworski LLP

(57) ABSTRACT

The various embodiments provide circuitry and methods for packing Log Likelihood Ratio ("LLR") values into a buffer memory in a compressed format which reduces the amount of buffer memory required. Various embodiments use a type of quantization which reduces the bit width of the LLR values that are stored, with the particular level of quantization depending upon the code rate of the data. The degree, pattern, and periodicity of bit width compression employed may depend upon the code rate of the received transmission. Bit width patterns use for LLR value quantization may be generated by a shift register circuit which provides an efficient mechanism for controlling an LLR packer circuit based upon the code rate of the received signal.

16 Claims, 9 Drawing Sheets

ENCODER IN TRANSMITTER

DECODER IN RECEIVER

| Code rate | Quantization pattern | Periodicity | LLRs/48 bits |
|---|---|---|---|
| 2/7 | 3,4,3,4,3,4,3,4,3,4,3,4,3,3 | 14 | 14 |
| 1/3 | 4 | 6 | 12 |
| 4/11 | 5,5,5,5,4,4,4,4,4,4,4 | 11 | 11 |
| 2/5 | 5,5,5,5,4 | 5 | 10 |
| 1/2 | 6 | 4 | 8 |
| 2/3 | 6,6,6, 6 unused bits | 4 | 6 |

US 8,582,696 B2

METHOD AND APPARATUS FOR DATA QUANTIZATION AND PACKING WITH VARIABLE BIT WIDTH AND PERIOD

RELATED APPLICATIONS

This application claims the benefit of priority to U.S. Provisional Patent Application No. 61/480,065 entitled "Application Method and Apparatus for Data Quantization and Packing with Variable Bit-Width and Period" filed Apr. 28, 2011, the entire contents of which are hereby incorporated by reference.

BACKGROUND

High capacity wireless broadcast technologies encode information in the frequency, phase and amplitude of radiofrequency signals. In order to protect signals from interference and permit receivers to recover information lost in transmission, information is also encoded with error correction information and scrambled in a manner that interleaves data across time. One of the encoding mechanisms employed is known as turbo encoding, which is well-known in the communication arts. Receiver devices process the received radio frequency signals by sampling the signal very rapidly, using the sampled signal to estimate the frequency, phase and amplitude that corresponds to encoded symbols, and processing those symbol estimates through error correction processing, which includes turbo decoding when the received signal was turbo encoded. The mechanisms of modulating data, applying error correction codes and turbo encoding on the transmit side, as well as the demodulating radio frequency signals and applying error correction and turbo decoding are well known.

SUMMARY

The various embodiments relate generally to data quantization and packing in wireless computing devices and more particularly to data quantization and packing with varying bit width and period based on the data's code rate. The embodiments include a method for processing received signals encoded with a code rate, including the operations of receiving from a receiver circuit Log Likelihood Ratio (LLR) values characterizing the received signals, quantizing the Log Likelihood Ratio values in a pattern, and storing the quantized Log Likelihood Ratio values in a buffer. Storing quantized LLR values enables more LLR values to be stored within a given size memory. The quantization pattern may depend upon the code rate of the received signals and include bit width values arranged in a period.

A further embodiment method for processing received signals encoded with a code rate includes receiving from a receiver circuit Log Likelihood Ratio values characterizing the received signals, selecting a pattern of bit width values arranged in a period based on the code rate, loading the selected pattern into a shift register, quantizing the Log Likelihood Ratio values based on control signals generated by the shift register, and storing the quantized Log Likelihood Ratio values in a buffer.

A further embodiment includes a computing device having memory and a display coupled to a processor in which the processor is configured with processor executable instructions to perform operations of the methods described above. A further embodiment includes a computing device having means for performing the operations of the methods described above.

A further embodiment includes a non-transitory processor-readable storage medium having stored thereon processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
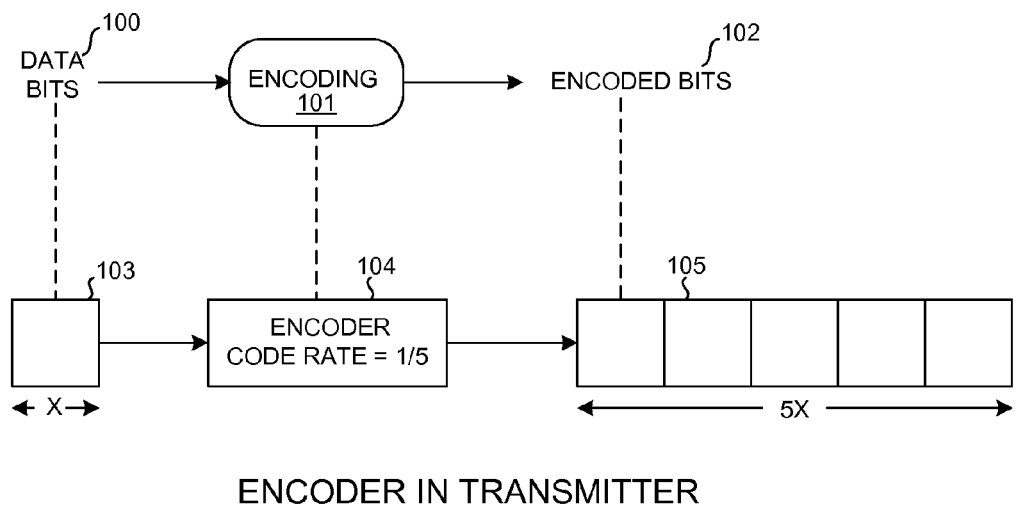
FIG. 1 is a simplified block diagram illustrating an encoding process performed in the transmitter of a wireless communication device.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "receiver device" is used herein to refer to any one or all of mobile media broadcast receivers, cellular telephones, personal television devices, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, receivers within vehicles (e.g., automobiles) and similar personal electronic devices which include a programmable processor and memory and wireless communication receiver circuitry for receiving and processing wireless transmissions, such as multimedia broadcast transmissions from a mobile television broadcast system.

The word "broadcast" is used herein to refer to the transmission of data (information packets) so that it can be received by a large number of receiving devices simultaneously. Examples of broadcast messages are mobile television service broadcast signals, including content broadcasts (content flow) and overhead information broadcasts (overhead flow) such as metadata messages. References to broadcast also include multicast.

A number of different mobile broadcast television services and broadcast standards are available or contemplated in the future, all of which may implement and benefit from the various embodiments. Such services and standards include, e.g., Open Mobile Alliance Mobile Broadcast Services Enabler Suite (OMA BCAST), MediaFLO®, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB). Each of these broadcast formats involves a broadcast communication channel. For ease of reference, the various embodiments are described with reference to a mobile TV broadcast system. However, references to mobile TV broadcast terminology and technical details are for illustrative purposes only and are not intended to limit the scope of the claims to a particular broadcast communication system or technology unless specifically recited in the claim language.

In communication systems, such as receiver device systems, information may be communicated between devices in the presence of noise and other environmental factors that interfere with the communication. To prevent loss of information in the presence of noise and other signal interference, the original information to be communicated is often encoded along with additional information before the information is encoded into a radio frequency (RF) signal for wireless transmission. After reception, the information obtained from the received signal is decoded to recover the original information. Due to the encoding and decoding process, if some of the transmitted information is lost during transmission between transmitter and receiver, the error correction decoding process may be used to recover the original information by determining what information is missing.

Various embodiments provide improved methods and circuits for processing signals received by a wireless receiver device by quantizing LLR values so that more LLR information may be stored in buffer memory prior to error correction decoding. New technology receiver devices, such as the latest generation of mobile television broadcast receivers, perform error correction decoding over larger blocks of data than has been the practice in the past. Accomplishing error correction encoding and decoding over large blocks of data enables more robust transmission of data, since the error correction decoding process has more information that can be used for recovering lost bits. However, error correction encoding and decoding over large blocks of data requires a large number of LLR values to be stored in buffer memory before error correction decoding can be accomplished in the receiver device. In the latest generation mobile television broadcast receivers, error correction decoding is accomplished over a one second long superframe, which may include multiple turbo encoded packets. Each packet may be encoded independently and span the full superframe. The entire superframe of data must be buffered before decoding can start. Thus, without quantization of LLR values, the amount of buffer memory required to support error correction decoding could be excessive. The various embodiments provide efficient mechanisms for compacting LLR data stored in buffer memory by performing quantization of the LLR values based on the coding rate of the received transmissions. An efficient circuit based upon shift registers for controlling the LLR quantization process is also provided.

FIG. 1 is a simplified block diagram illustrating an error correction encoding process. A plurality of bits 100 of data undergoes encoding 101 to generate a larger number of encoded bits 102. The encoding process adds redundancy to the original data in the form of extra bits for more information regarding the information being transmitted which results in several encoded bits 102 for each incoming bit 100. The encoded bits 102 are sometimes referred to as "symbols." The measure of redundancy introduced by encoding 101 may be referred to as the "code rate." In the illustration, a data packet 103 containing "X" number of data bits is encoded by an encoder 104 with a code rate of ⅕. The code rate of ⅕ means that the encoder 104 produces five encoded bits 105 for each data bit in data packet 103. The encoder 104 may be a turbo encoder or a Viterbi encoder, for example. The added redundancy provides information that can be used in the decoding process to recover any distorted data due to noise and disturbances in the transmission path. After the encoding process, encoded bits 105 are typically blocked together by a modulator (not shown) and mapped to points on a frequency versus amplitude constellation by a mapper (not shown) to encode the signal in an RF waveform before being transmitted to a receiver.

A variety of different coding rates may be used depending upon the priority of the channel and the amount of information that needs to be transmitted within a given bandwidth. For example, data that would be intolerant of transmission errors may be encoded with a code rate of ⅕ to provide a relatively robust transmission channel (i.e., a transmission channel that can successfully deliver data to receiver devices in the presence of significant noise and interference) at the cost of a relatively low code rate due to the relatively high amount of redundancy. In other words, by transmitting five times as many bits of data as the data to be received, a broadcaster can have greater assurance that the data will be received accurately by most receiver devices. The cost of this greater assurance is a data rate that is five times lower. As another example, urgent data that must be transmitted at a high rate but for which occasional bit errors can be tolerated (e.g., video data) may be encoded with a code rate of ½ to provide a relatively high transmission rate since only two encoded bits are provided for each data bit in a data packet.

Figure 2:
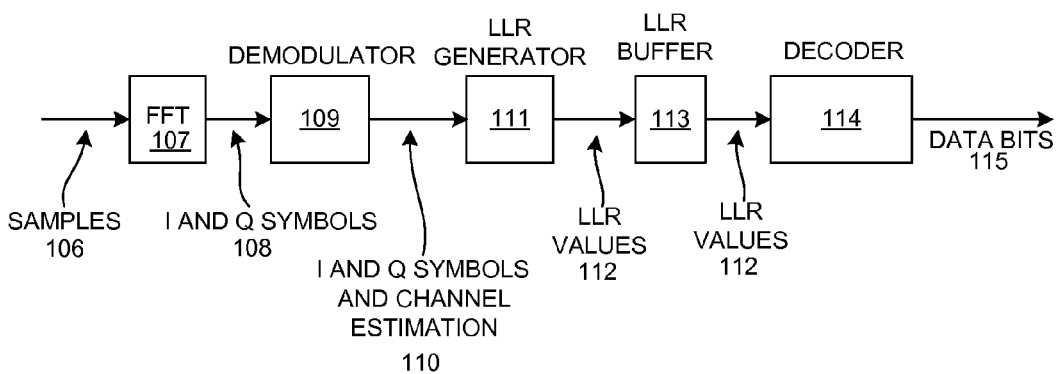
FIG. 2 is a simplified block diagram illustrating receiver channel processing in the receiver of a wireless communication device.

FIG. 2 is a simplified block diagram illustrating a part of the receiver circuit that receives the transmission of encoded data. The received signal is digitized to produce samples 106 which are digital values representing the amount of energy received in a brief sampling window. These samples 106 are converted by a Fast Fourier Transform (FFT) circuit 107 into real and imaginary symbols 108. A demodulator circuit 109 outputs an I/Q modulation symbol and complex channel estimation 110 for each symbol. The I/Q and complex channel estimation information is then converted by a Log-Likelihood Ratio (LLR) generator 111 into a set of soft-information values referred to as LLR values. Each LLR value 112 produced by LLR generator 111 is stored into an LLR buffer memory 113. The LLR buffer memory 113 may be a Random-Access Memory (RAM). The LLR buffer memory holds at least a number of LLR values as required to accomplish the error correction decoding process, which is a function of the number of bits that are encompassed within the error correction encoding process. The number of bits used to represent each LLR value 112 is referred to as the "LLR bit width." For example, a typical LLR bit width in one type of a broadcast receiver is six bits. If the LLR bit width is larger, then more LLR buffer memory is required to store the same number of LLR values, whereas if the LLR bit width is smaller then less LLR buffer memory is required to store the LLR values. In order to perform the error correction decoding process, the LLR values are recalled from LLR buffer 113 and decoded by a decoder 114 to generate data bits 115. Ideally, data bits 115 of FIG. 2 are identical to the original data bits 103 of FIG. 1, despite the presence of interference and the noise of some of the transmission from the transmitter to the receiver.

Figure 3:
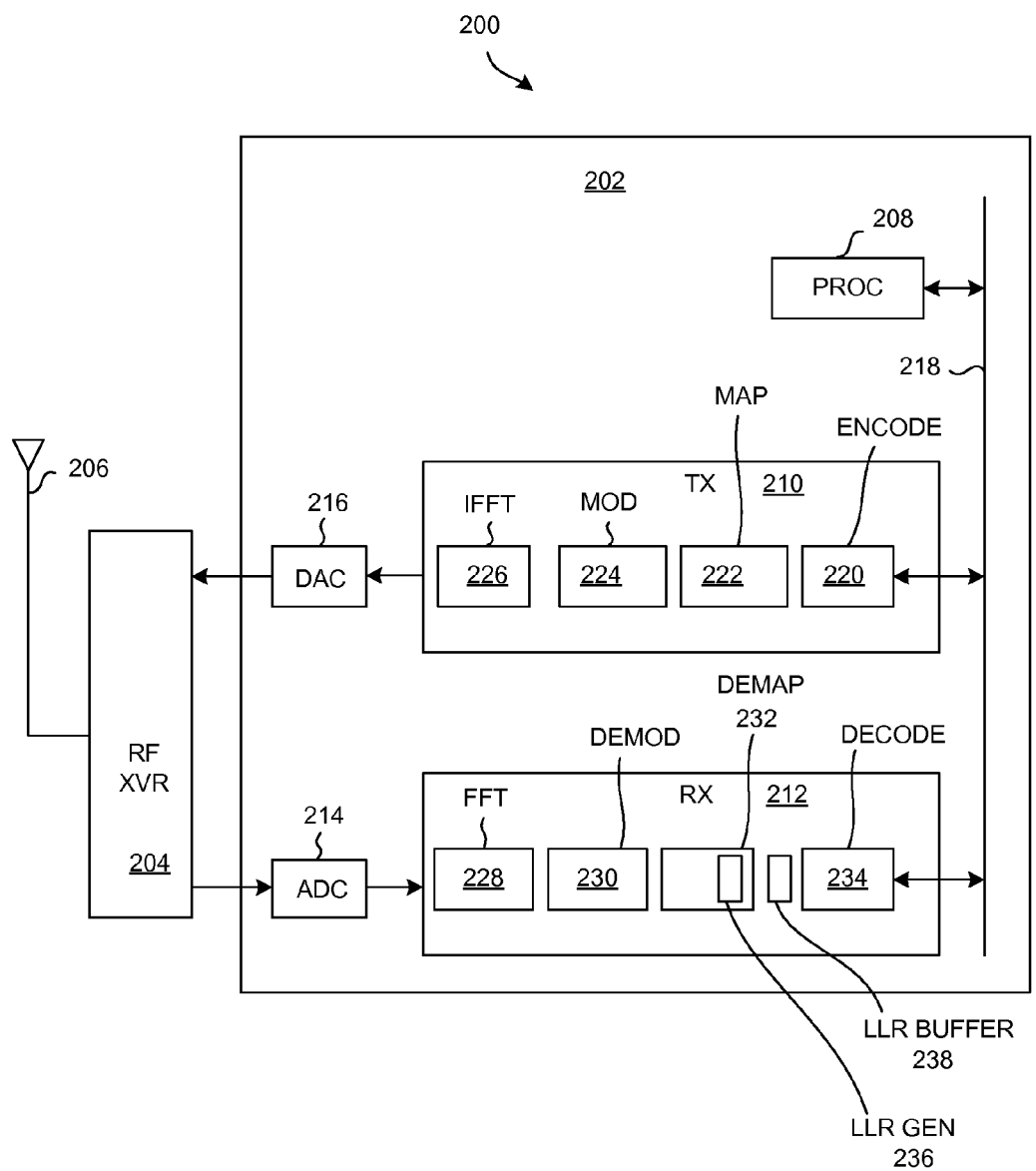
FIG. 3 is a simplified functional block diagram of a wireless communication device suitable for use with the various embodiments.

FIG. 3 illustrates a simplified high level block diagram of a mobile communication receiver device 200 including coding and decoding elements. The receiver device 200 may, for example, be a cellular telephone. The receiver device 200 may include a digital baseband integrated circuit 202, a radio-frequency (RF) transceiver integrated circuit (RF XVR) 204, and an antenna 206. The digital baseband integrated circuit 202 may include a processing circuit 208, a transmit chain (TX) 210, a receiver chain (RX) 212, an Analog-to-Digital Converter (ADC) 214, a Digital-to-Analog Converter (DAC) 216, and a bus 218. The transmit chain 210 may include an encoder circuit (ENCODE) 220, a map circuit (MAP) 222, a modulator circuit (MOD) 224, and an Inverse Fast Fourier Transform circuit (IFFT) 226. The receiver chain 212 may include a Fast Fourier Transform circuit (FFT) 228, a demodulator circuit (DEMOD) 230, a demap circuit (DEMAP) 232, and a decoder circuit (DECODE) 234. The DEMAP 232 may include several sub-circuits including an LLR generator 236. An LLR buffer 238 may store the generated LLR values.

In a very simplified operational example, data may be communicated to receiver device 200 from a wireless broadcast system, such as a transmitter in a mobile television broadcast network (not shown separately). The wireless broadcast system may include a transmit channel similar to the one illustrated in FIG. 3. The data may be encoded by passing through similar ENCODE, MAP, MOD, and IFFT elements and converted into analog form by a DAC for transmission or broadcast as an RF signal. The antenna 206 of a receiver device 200 may receive the encoded RF signal. The signal may be downconverted in frequency by RF XVR 204 and may be converted into digital form by ADC 214. The digital information may pass through a receiver (RX) chain 212 through FFT 228, DEMOD 230, DEMAP 232, and DECODE 234 elements. The resulting digital information passes via bus 218 to a processing circuit 208.

The various embodiments provide circuitry and methods for packing LLR data into a buffer memory in a more compressed format which reduces the amount of buffer memory required. As mentioned above, these embodiments may enable error correction decoding over larger block of data (e.g., a full superframe's worth of bandwidth data) with smaller buffer memories. Embodiments use a type of quantization which reduces the bit width of the LLR values that are stored, with the particular level of quantization depending upon the code rate of the data. Because slower code rates (e.g., $2/7$ and $1/3$) provide greater error correction capability, fewer bits of information may be used to characterize each LLR, since errors resulting from mischaracterized LLR values can be corrected in the turbo decoding process. Conversely, higher code rates (e.g., $1/2$ and $2/3$) feature less error correction capability, and therefore may require more bits of information to characterize each LLR in the receiver. Thus, the degree of bit width compression employed may depend upon the code rate of the received transmission.

The pattern of bit width quantization may also depend on the code rate. For example, all of the LLR values may be adjusted to the same bit width based on a particular code rate. In response to a different code rate, each of the LLR values may be adjusted in a varying pattern of bit widths, such as alternating between two or more bit widths. The periodicity of the patterns may also depend on the code rate. Further embodiments may include more complex bit width patterns with varying periodicity. Additionally, the embodiments include a shift register circuit configured to efficiently control the LLR quantization bit widths.

Figure 4:
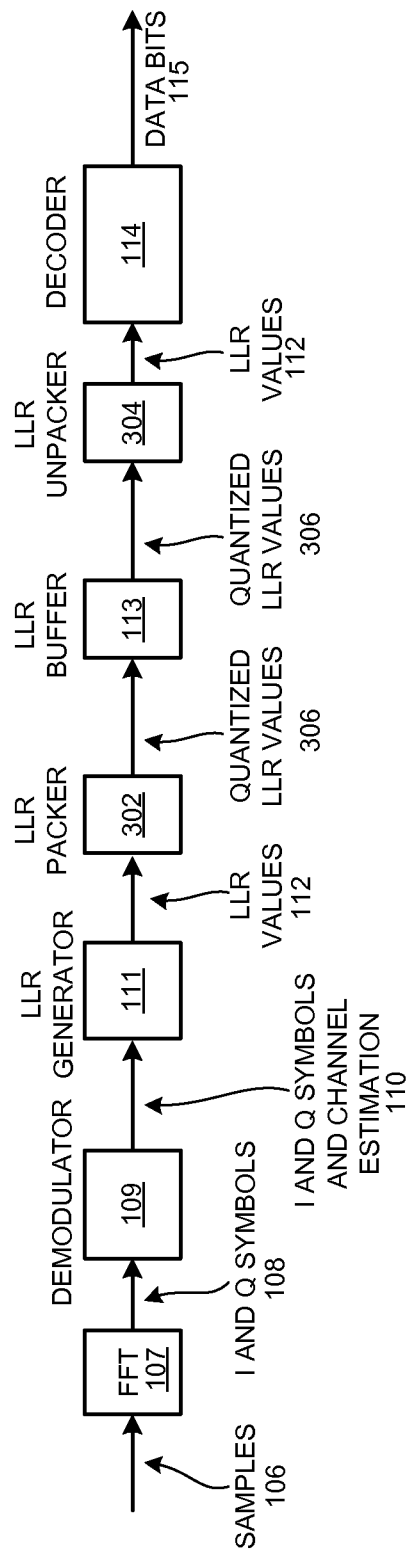
FIG. 4 is a simplified block diagram of a portion of an embodiment receiver channel the receiver of a wireless communication device.

FIG. 4 illustrates an embodiment data path in a receiver circuit. Similar to the diagram in FIG. 2, samples 106 taken by an ADC 214 of the received signal may be converted by an FFT circuit 107 into symbols 108. A demodulator circuit 109 may output I/Q modulation symbols and channel estimation information 110 for each symbol. The I/Q and channel estimation information may then be converted by a Log-Likelihood Ratio (LLR) generator 111 into LLR values. These LLR values 112 may be quantized and packed by an LLR packer 302 prior to being stored in an LLR buffer 113. Quantization may involve adjusting the bit width of each LLR. The quantized LLR values 306 may also be quantized in various patterns of bit widths. The period and bit widths of these patterns may be based on the code rate of the received signal. Quantized LLR values may undergo an inverse process in an LLR unpacker 304. Unpacked LLR values 112 may go to a decoder 114 to decode data bits 115 from the LLR values.

Figure 5:
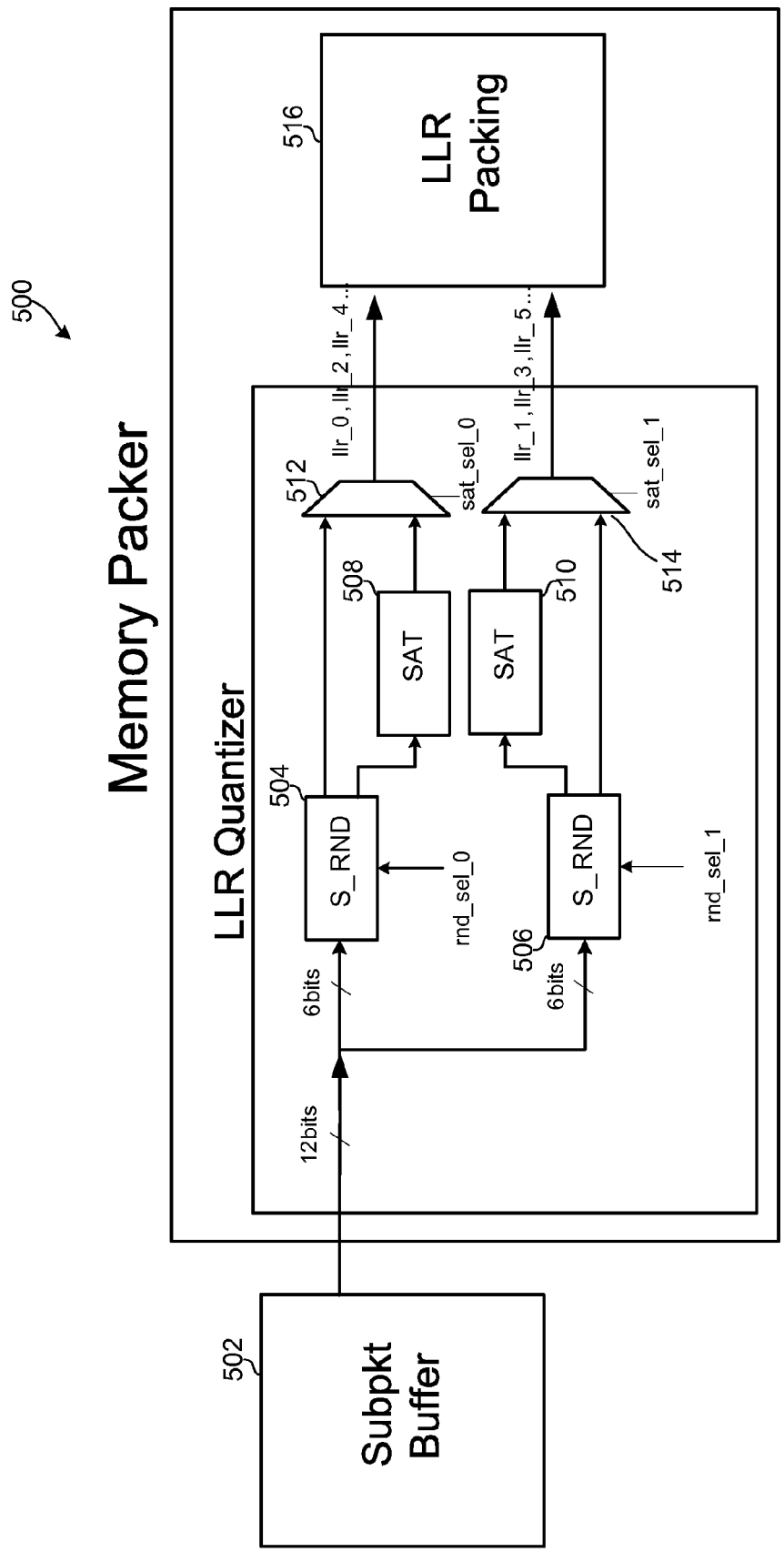
FIG. 5 is a block diagram of a Log Likelihood Ratio quantizer and packing module according to an embodiment.

FIG. 5 illustrates an embodiment LLR packer 500 capable of quantizing and packing LLR values with different bit width patterns for various code rates. The LLR values may be temporarily stored in a sub package ("subpkt") buffer 502. The LLR packer 500 includes two LLR value rounding modules (S_RND) 504 and 506. Other embodiments may include a single LLR rounding module or additional LLR rounding modules. The amount of rounding or quantization of the LLR values by each of the LLR rounding modules 504, 506 may be determined by control signals (rnd_sel_0 and rnd_sel_1) which set the bit width which each LLR value should be quantized. As illustrated in FIG. 5, LLR values may be quantized two at a time by the parallel LLR rounding modules 504, 506. For example, the LLR values in one type of mobile broadcast receiver are six bits in width. Thus, 12 bits worth of data may be received from the sub package buffer 502, and six bits, or one LLR value, may be processed by each LLR rounding module 504, 506. Saturation (SAT) modules 508 and 510 may detect when the signal strength of the LLR value exceeds a linear range and thus saturates, in which case a default value is applied by the saturation module 508, 510. Multiplexers 512, 514 may be configured to receive as inputs the outputs of the LLR value rounding modules 504, 506 and the saturation modules 508, 510, and output the quantized LLR values in a proper sequence for packing within the LLR packing module 516. The multiplexers 512 and 514 may be controlled by control signals sat_sel_0 and sat_sel_1, respectively.

The quantized LLR values may be packed by the LLR packing module 516 in a format suitable for storage in the buffer memory. In an embodiment, quantized LLR values may be packed into 48 bits packets which are then stored in the buffer memory. In some embodiments, the bit patterns used in the quantization process are designed to repeat every 48 bits with the quantized LLR information packed into a buffer memory 113 which has three rows that are 16 bits in length.

As mentioned above, the various embodiments reduce the number of bits required to store a block of LLR values to enable data from a one second superframe to be stored in the buffer memory before the data is withdrawn from the buffer for the error correction decoding process.

Figure 6:
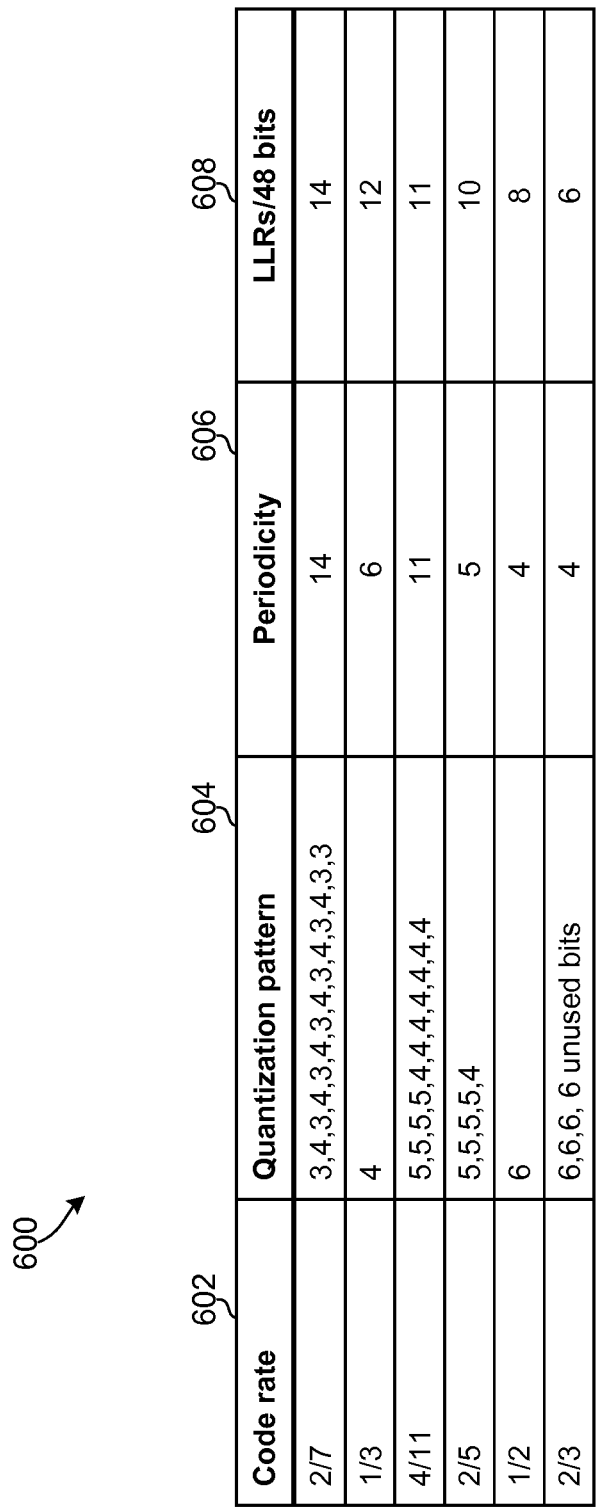
FIG. 6 is an example table of code rates associated with bit width quantization patterns, periodicity, and LLR values/48 bits.

FIG. 6 illustrates a table 600 of exemplary bit width patterns associated with certain code rates that may be implemented in some embodiments. In this example table 600, column 602 includes code rates, and column 604 includes the quantization pattern associated with each of the code rates in column 602. Each sequence of numbers in column 604 may represent a pattern of bit widths for quantization of LLR values based on the corresponding code rate. For example, if a transmission's code rate was 2/7 (i.e., there are 7 transmitted bits for each 2 bits of data to be received), the associated quantization pattern would be 3, 4, 3, 4, 3, 4, 3, 4, 3, 4, 3, 4, 3, 3. An LLR packer, such as packer 500 illustrated in FIG. 5, may quantize LLR values according to this bit width pattern. For example, in one type of mobile broadcast system the LLR values would typically have a bit width of six bits. For a code rate of 2/7, the LLR packer may quantize a first six-bit LLR value into three bits, a second six-bit LLR value into four bits, a third six-bit LLR value to three bits, and so on according to the pattern.

Table 600 also includes column 606 which identifies the periodicity associated with each code rate and quantization pattern. Column 608 includes LLR/48 bits indicating how many LLR values are being packed between quantization patterns of varying periodicities.

A quantization pattern may be selected based upon a transmission's code rate which may be determined in various ways. For example, the code rate may be identified in overhead data of a broadcast signal, or may be standardized for certain transmissions based on timing or other properties. Once a code rate is known to a receiver device, a quantization pattern may be determined, such as by a table look up function or use of the shift register mechanism of the various embodiments. The bit width values of the determined pattern may then be fed into an LLR packer as control signals for the LLR value rounding modules 504, 506.

Figure 7:
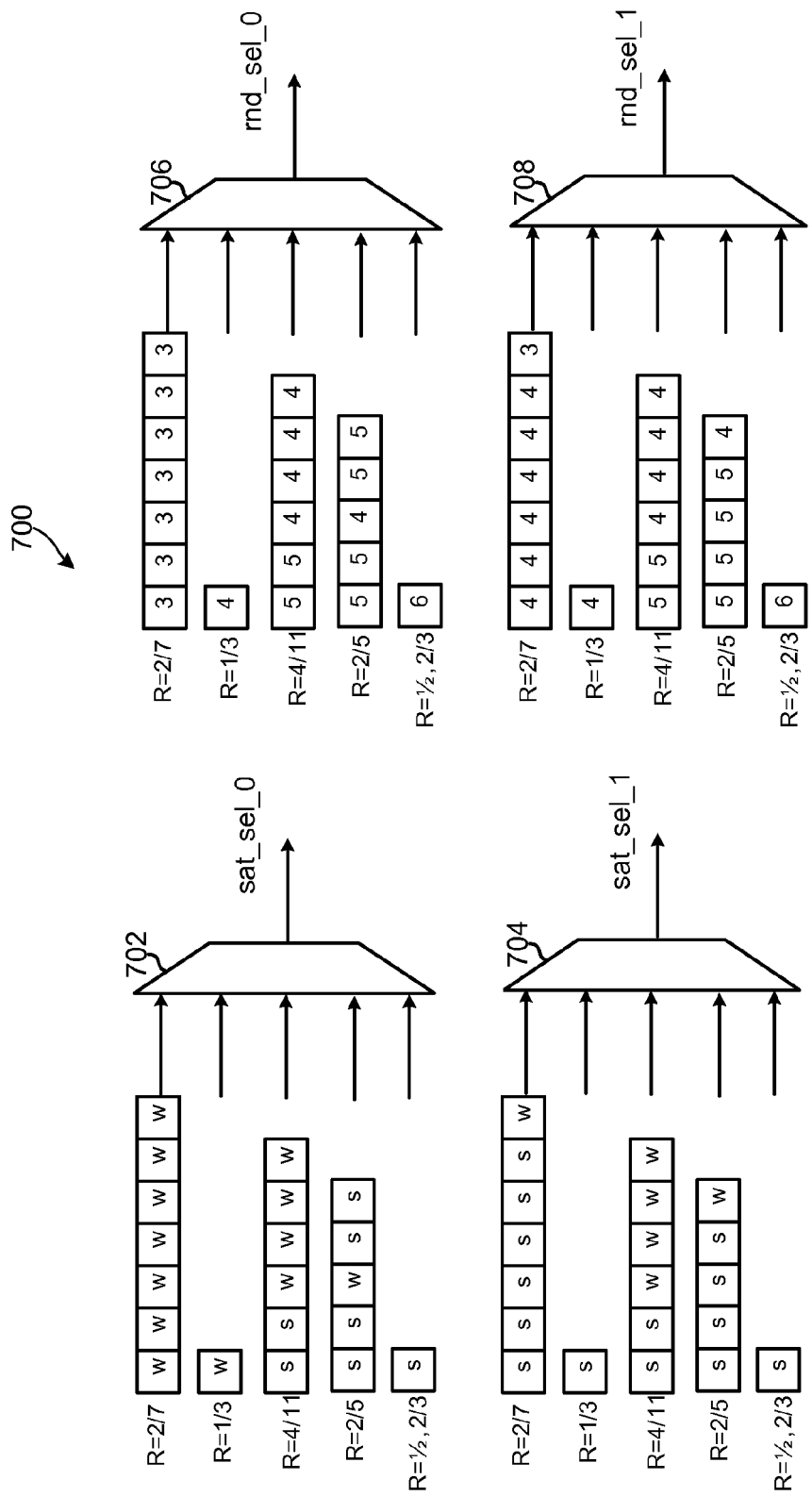
FIG. 7 is a block diagram of a system of multiplexers used for generating control signals based on quantization patterns according to an embodiment.

Various embodiments may generate control signals, such as control signals rnd_sel_0, rnd_sel_1, sat_sel_0, and sat_sel_1 discussed above, to coordinate quantization in an LLR packer. Control signals may be generated in various different ways. In some embodiments, the patterns for each code rate may be multiplexed together. As illustrated in FIG. 7, system 700 includes multiplexers 702, 704, 706, and 708. Each multiplexer 702, 704, 706, and 708 may generate a control signal based on a selected code rate. Multiplexers 702, 704, 706, and 708 are illustrated with only five separate inputs corresponding to different code rates. However, as the total number of possible code rates increases, so must the number of inputs. Thus, a receiver potentially dealing with several additional code rates may require a very complicated multiplexer. For this reason, these embodiments may be limited in scalability.

Figure 8:
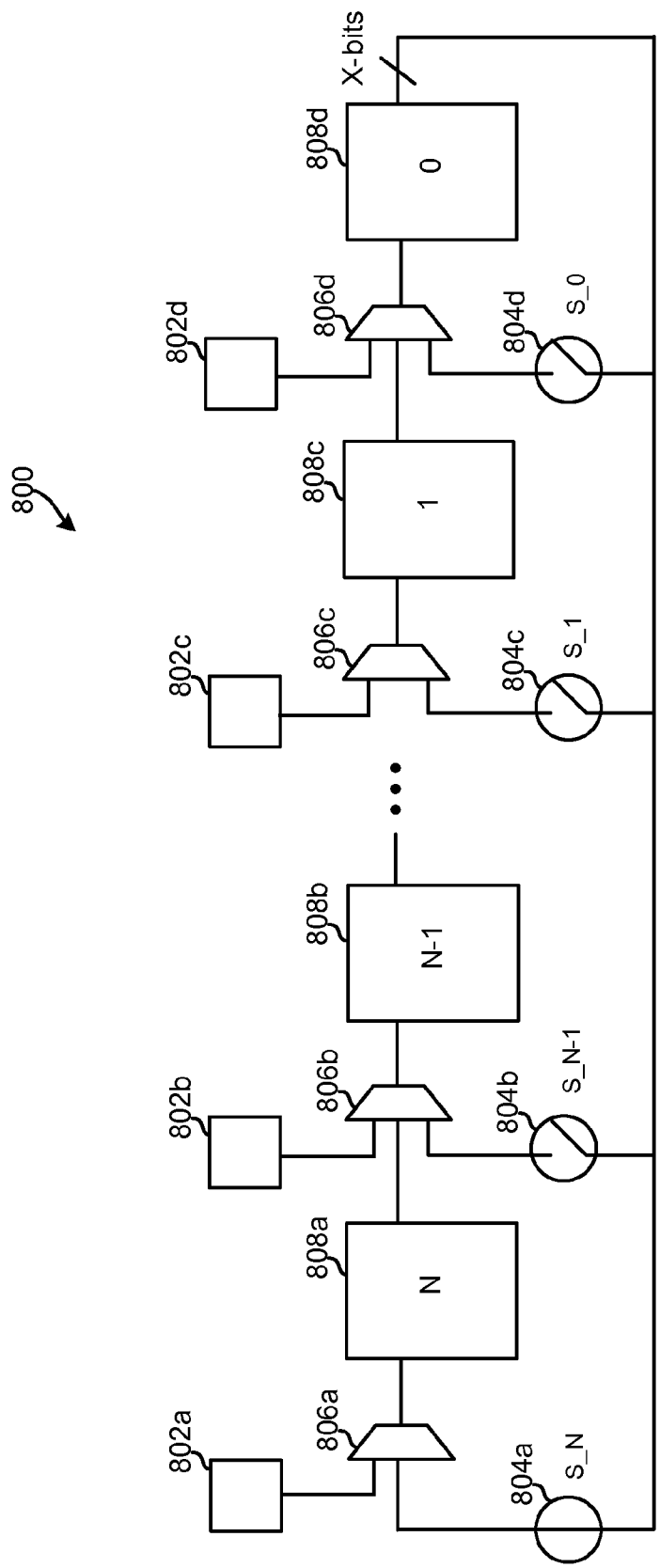
FIG. 8 is a block diagram of a shift register circuit for generating a control signal based on a quantization pattern according to an embodiment.

An alternative embodiment generates control signals using a shift register circuit 800 such as illustrated in FIG. 8. The shift register circuit 800 may include several modules 808a, 808b, 808c, 808d configured to hold a bit width value. The number of such modules 808a, 808b, 808c, 808d may be equal to or exceed the number of bit widths in the quantization pattern with the largest period. The shift register may also include the same number of switches 804a-d, registers 802a-d, and multiplexers 806a-d.

For any code rate, a bit width pattern with a period of N may be selected by closing a corresponding switch N while the remaining switches remain open. This switch configuration may create a loop of N modules 808a, 808b, 808c, 808d. The N bit widths of the selected bit width pattern may be loaded into the N modules. The registers 802a-d may have bit width patterns encoded in them. Each register may pass the appropriate bit width according to the selected pattern to a module. For example, the first bit width in the quantization pattern for the 2/7 code rate is three bits. A register corresponding to a first module, such as register 802d which corresponds to module 808d in FIG. 8, may pass a value representing a bit width of three bits to the module. The value may pass through a multiplexer, such as multiplexer 806d illustrated in FIG. 8. A second register may pass the second bit width in the pattern to a corresponding second register through a second multiplexer. For example, register 802c may pass a value representing a bit width of four bits, the second bit width of the pattern for the 2/7 code rate, through multiplexer 806c to module 808c. Similarly, each of the remaining modules may be populated so that the N bit widths of the quantization pattern are loaded into N modules.

After a pattern of bit width values are initially loaded into the N modules, the shift register circuit 800 may begin generating a control signal by sequentially shifting values loaded in the modules. The values may shift down the loop so that the value corresponding to the first bit width loaded in the first module may be output and then shifted to the final module N. For example, the value representing the bit width of three bits may be output, as indicated in FIG. 8 by the X-bits symbol. The output may serve as the control signal to the LLR packer and indicate that the first LLR value should be quantized into a quantized LLR value with a bit width of three bits. The value may also be looped back through the closed switch 804a, through the multiplexer 806a, and to the module 808a. The multiplexer 806a may select the input from module 808d rather than register 802a. This input may be available because the switch 804a is closed.

The remaining modules within the shift register circuit may shift their values to the next lower module, such as from the N module to the N−1 module, and so on down the chain until the value in the second module shifts to the first module. Each of the multiplexers may select the input from the next higher module or from the register. Thus, the values may all shift by one module in the loop.

Subsequent shifts may output the next value in the quantization pattern and shift all of the values in the loop again. After enough shifts, the values will cycle through the quantization pattern's period. Shifting may continue for as many periods as necessary for packing the LLR values of a transmission into the LLR packer.

The shift register circuit of the various embodiments may enjoy advantages over other methods or systems for controlling the LLR packer. For example, a shift register circuit of the various embodiments may continue looping the pattern without any table lookups or complex multiplexing each time another bit width in the quantization pattern is needed. The shift register circuit is also easier to scale up as it may require only more of the same modules and parts rather than more complex components to address more and more complex LLR value quantization bit width patterns.

If a new code rate or quantization pattern is needed, the previous closed switch may be open and a different switch closed to match the number of modules in the loop to the number of bit widths in the new quantization pattern. The registers may be used to load the initial quantization pattern values. The shift register may then shift to output each of the pattern values as described above.

Various embodiments may include multiple shift registers circuits such as the embodiment illustrated in FIG. 8. The output from each shift register circuit may correspond to a control signal, such as control signals rnd_sel_0, rnd_sel_1, sat_sel_0, and sat_sel_1 illustrated in FIG. 5. Some embodiments may have multiple quantization modules in the LLR packer, such as the two modules 504 and 506 illustrated in FIG. 5. In this embodiment, the quantization pattern may be distributed between multiple shift register circuits. For example, for the quantization pattern associated with a code rate of ⅔ in table 600 of FIG. 6 is 3, 4, 3, 4, 3, 4, 3, 4, 3, 4, 3, 4, 3, 3, the pattern may be distributed to two shift registers circuits to generate separate control signals for the two quantization modules 502, 504 in the LLR packer. If the quantization modules are alternating and quantizing every other LLR value, the pattern may be broken into even and odd bit widths. In this case, the first shift register may use the odd bit widths values of the pattern (3, 3, 3, 3, 3, 3, 3) and the second shift register may use the even bit width values (4, 4, 4, 4, 4, 4, 3). Alternatively, such distributed patterns may be provided to the two multiplexers 706 and 708 to generate two separate control signals in the embodiment illustrated in FIG. 7. Various embodiments may include other distributions of quantization patterns, such as distributing the pattern control signal among more than two shift registers or distributing more values to some shift registers than others.

Figure 9:
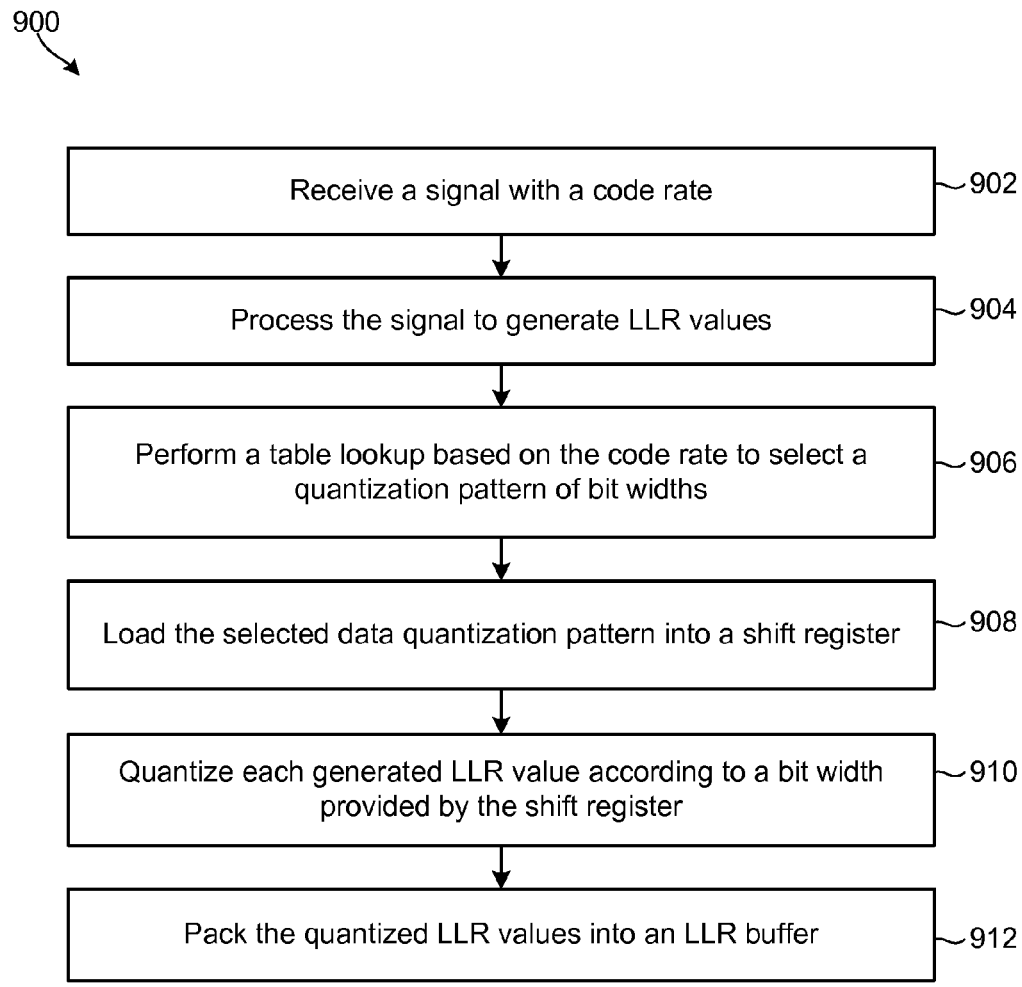
FIG. 9 is a process flow diagram of an embodiment method for quantizing LLR values based on a quantization pattern selected based on a received signal's code rate.

FIG. 9 illustrates an embodiment method 900 that may be performed on a receiver device. The receiver device may receive a wireless signal that carries data having error correction encoding exhibiting a particular code rate, block 902. The code rate may be standard for a particular signal, or rate may be determined by the receiver device from an overhead stream in the signal. The receiver device 200 may process the received signal in a variety of ways to generate LLR values, block 904. This signal processing may include demodulating the signal by sampling the signal and converting the samples into LLR values. A table lookup may be performed based on the signal's code rate to select a quantization pattern of bit widths, block 906. For example, such a table lookup may be performed on exemplary table 600 of FIG. 6 providing code rates and corresponding quantization patterns. The selected data quantization pattern may be loaded into a shift register circuit, block 908. This may include closing a switch within the shift register circuit to create a loop of value holding modules equal to the number of bit widths in the selected pattern. The pattern's initial bit width values may be loaded into the value holding modules from registers via multiplexers.

Each of the generated LLR values may be quantized according to a bit width value provided by the shift register, block 910. An LLR packer 500 including quantization modules 504 and 506 may be used to quantize the LLR values. The values from the shift register may act as control signals to the quantization modules and control the bit width of the quantized LLR values. The quantized LLR values may be packed into an LLR buffer, block 912.

Alternate embodiment methods and systems may integrate quantization pattern controls and an LLR generator. For example, rather than generate LLR values and then separately quantize them based on control signals, various embodiments may incorporate the control signals into the generation process to generate LLR values according to the quantization pattern in a single operation. Shift registers 800 or multiplexers 700 as described above may be linked to an LLR generator 111 and may provide similar control signals based on a quantization pattern selected based on a received signal's code rate. LLR values may be generated based on the control signals to fit bit widths in the selected quantization pattern. These LLR values may be packed in an LLR buffer 113 and later unpacked and decoded.

Figure 10:
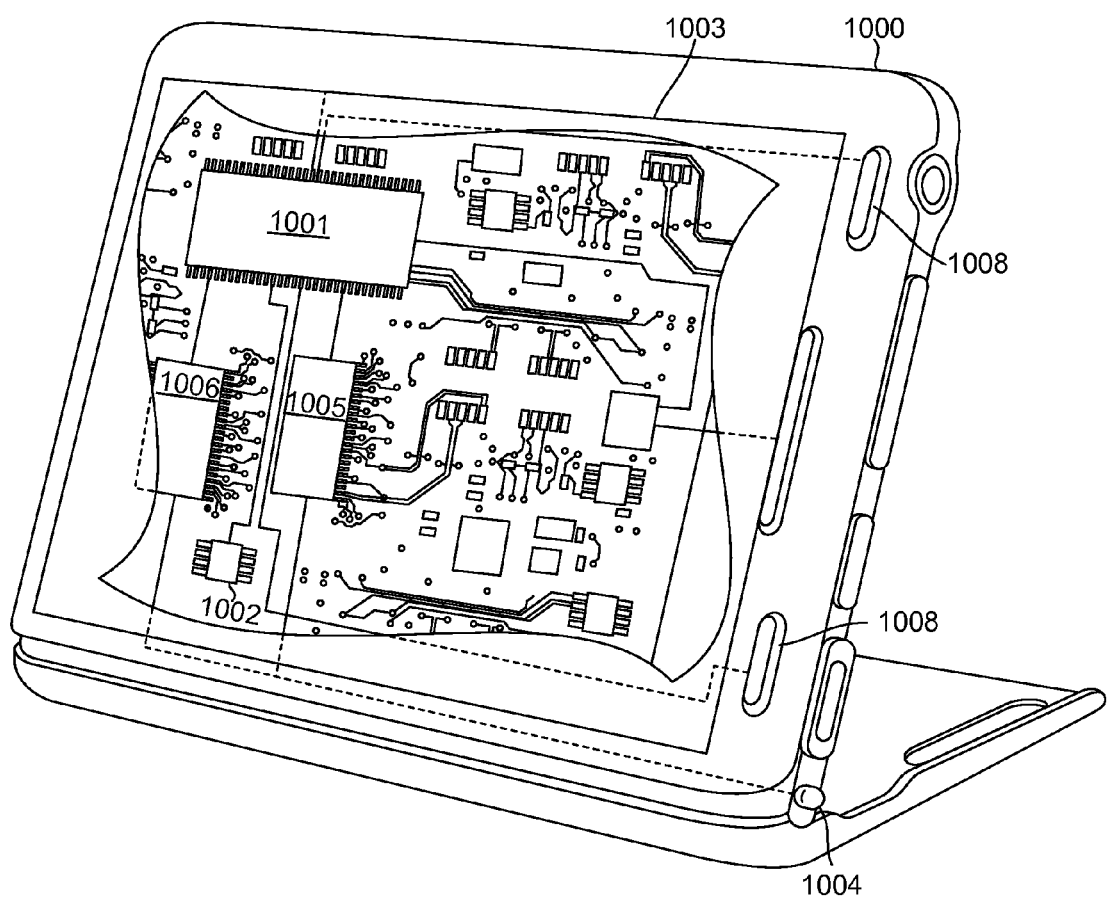
FIG. 10 is a component block diagram of an example receiver device suitable for use with the various embodiments.

FIG. 10 is a system block diagram of a receiver device suitable for use with any of the embodiments. A typical receiver device 1000 may include a processor 1001 coupled to internal memory 1002, to a display 1003, and to a speaker 1008. Additionally, the receiver device 1000 will include an antenna 1004 for sending and receiving electromagnetic radiation that may be connected to a wireless data link and/or cellular telephone transceiver 1005 coupled to the processor 1001 and a mobile multimedia broadcast receiver 1006 coupled to the processor 1001. The various embodiment LLR packer and shift register circuits may be included as hardware and/or software components within either or both of the transceiver 1005 and mobile multimedia broadcast receiver 1006.

The processor 1001 may be any programmable microprocessor, microcomputer or multiple processor chip or chips that can be configured by software instructions (applications) to perform a variety of functions, including the functions of the various embodiments described below. In some mobile receiver devices, multiple processors 1001 may be provided, such as one processor dedicated to wireless communication functions and one processor dedicated to running other applications. Typically, software applications may be stored in the internal memory 1002 before they are accessed and loaded into the processor 1001. The processor 1001 may include internal memory sufficient to store the application software instructions.

The foregoing method descriptions and the process flow diagrams are provided merely as illustrative examples, and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The operations of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such a non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of, non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of processing received signals encoded with a code rate, comprising:
   receiving by one or more computer processors from a receiver circuit Log Likelihood Ratio values characterizing the received signals;
   selecting by the one or more computer processors, dependent upon the code rate of the received signals, a bit width pattern comprising two or more different bit width values arranged in a period through which the bit width values cycle;
   quantizing by the one or more computer processors the Log Liklihood Ratio values according to the bit width pattern by employing the bit width values to determine numbers of bits used to represent the Log Liklihood Ratio values; and
   storing by the one or more computer processors the quantized Log Likelihood Ratio values in a buffer memory prior to error correction decoding.

2. The method of claim 1, further comprising:
   recalling the stored quantized Log Likelihood Ratio values from the buffer; and
   passing the recalled quantized Log Likelihood Ratio values to a decoder for decoding.

3. The method of claim 1, further comprising:
   loading the selected bit width pattern into a shift register circuit; and
   generating control signals from the shift register circuit to indicate the numbers of bits that should be used to represent the Log Liklihood Ratio values,
   wherein quantizing the Log Likelihood Ratio values according to the bit width pattern is accomplished in response to the control signals generated by the shift register circuit.

4. The method of claim 3, wherein generating control signals from the shift register circuit comprises generating a control signal by sequentially outputting and shifting values loaded in modules configured to store bit width values.

5. A receiver device configured to receive signals with a code rate, comprising:
   a processor;
   a receiver circuit coupled to the processor and configured to receive multimedia broadcasts; and
   a memory coupled to the processor,
   wherein the processor is configured with processor-executable instructions to perform operations comprising:
      receiving from the receiver circuit Log Likelihood Ratio values characterizing the received signals;
      selecting, dependent upon a code rate of the received signals, a bit width pattern comprising two or more different bit width values arranged in a period through which the bit width values cycle;
      quantizing the LOG Liklihood Ratio values according to the bit width pattern by employing the bit width values to determine numbers of bits used to represent the Log Liklihood Ratio values; and
      storing the quantized Log Likelihood Ratio values in a buffer memory prior to error correction decoding.

6. The receiver device of claim 5, wherein the processor is configured with processor-executable instructions to perform operations further comprising:
   recalling the stored quantized Log Likelihood Ratio values from the buffer memory; and
   passing the recalled quantized Log Likelihood Ratio values to a decoder for decoding.

7. The receiver device of claim 5, further comprising a shift register circuit coupled to the processor, wherein the processor is configured with processor-executable instructions to perform operations further comprising:
   loading the selected bit width pattern into the shift register circuit; and
   generating control signals from the shift register circuit to indicate the numbers of bits that should be used to represent the Log Liklihood Ratio values,
   wherein quantizing the Log Likelihood Ratio values according to the bit width pattern is accomplished in response to the control signals generated by the shift register circuit.

8. The receiver device of claim 7, wherein generating control signals from the shift register circuit comprises generating a control signal by sequentially outputting and shifting values loaded in modules configured to store bit width values.

9. A receiver device configured to receive signals with a code rate, comprising:
   means for receiving Log Likelihood Ratio values characterizing the received signals;

means for selecting, dependent upon a code rate of the received signals, a bit width pattern comprising two or more different bit width values arranged in a period through which the bit width values cycle;

means for quantizing the LOG Liklihood Ratio values according to the bit width pattern by employing the bit width values to determine numbers of bits used to represent the Log Liklihood Ratio values; and means for storing the quantized Log Likelihood Ratio values in a buffer memory prior to decoding.

10. The receiver device of claim 9, further comprising:
means for decoding received signals;
means for recalling the stored quantized Log Likelihood Ratio values from the buffer memory; and
means for passing the recalled quantized Log Likelihood Ratio values to the means for decoding received signals.

11. The receiver device of claim 9, further comprising:
a shift register circuit;
means for loading the selected bit width pattern into the shift register circuit; and
means for generating control signals from the shift register circuit to indicate the numbers of bits that should be used to represent the Log Liklihood Ratio values,
wherein means for quantizing the Log Likelihood Ratio values according to the bit width pattern comprises means for quantizing the Log Likelihood Ratio values in response to the control signals generated by the shift register circuit.

12. The receiver device of claim 11, wherein means for generating control signals from the shift register circuit comprises means for generating a control signal by sequentially outputting and shifting values loaded in modules configured to store bit width values.

13. A non-transitory processor-readable storage medium having stored thereon processor-executable instructions configured to cause a processor of a receiver device to perform operations comprising:

receiving from a receiver circuit Log Likelihood Ratio values characterizing received signals encoded with a code rate;

selecting, dependent upon the code rate of the received signals, a bit width pattern comprising two or more different bit width values arranged in a period through which the bit width values cycle, quantizing the Log Liklihood Ratio values according to the bit width pattern by employing the bit width values to determine numbers of bits used to represent the Log Liklihood Ratio values; and storing the quantized Log Likelihood Ratio values in a buffer memory prior to error correction decoding.

14. The non-transitory processor-readable storage medium of claim 13, wherein the stored processor-executable instructions are configured to cause a processor of a receiver device to perform operations further comprising:
recalling the stored quantized Log Likelihood Ratio values from the buffer memory; and
passing the recalled quantized Log Likelihood Ratio values to a decoder for decoding.

15. The non-transitory processor-readable storage medium of claim 13, wherein the stored processor-executable instructions are configured to cause a processor of a receiver device to perform operations further comprising:
loading the selected bit width pattern into a shift register circuit; and
generating control signals from the shift register circuit to indicate the numbers of bits that should be used to represent the Log Liklihood Ratio values,
wherein quantizing the Log Likelihood Ratio values according to a bit width pattern is accomplished in response to the control signals generated by the shift register circuit.

16. The non-transitory processor-readable storage medium of claim 15, wherein the stored processor-executable instructions are configured to cause a processor of a receiver device to perform operations such that generating control signals from the shift register circuit comprises generating a control signal by sequentially outputting and shifting values loaded in modules configured to store bit width values.

\* \* \* \* \*